PATRICK J. HOGAN, OF CINCINNATI, OHIO.

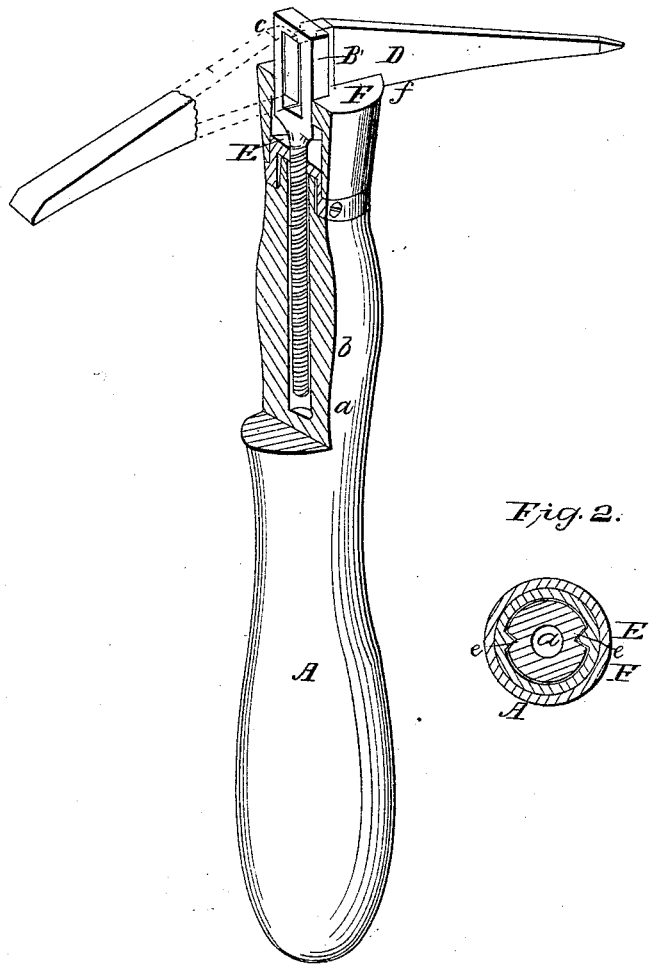
P. J. Hogan,
Pick Handle.
Nº 83,710.    Patented Nov. 3, 1868.

Letters Patent No. 83,710, dated November 3, 1868.

IMPROVEMENT IN ATTACHING HANDLES TO PICKS.

The Schedule referred to in these Letters Patent and making part of the same.

*To whom it may concern:*

Be it known that I, PATRICK J. HOGAN, of Cincinnati, Hamilton county, and State of Ohio, have invented a certain new and useful Improvement in Picks; and do hereby declare the following to be a full, clear, and exact description thereof, reference being had to the accompanying drawings, making part of this specification.

My invention consists of a combined arrangement of devices for securing a pick to its helve, and permitting its ready detachment for repair.

To this end I employ a ferrule, with a threaded aperture, receiving the screw-stem of a rectangular eye, which fits around the pick-head and in a notch therein. The head also fits in a groove across the face of a socket, which is swivelled on the ferrule of the handle, to adapt the handle to turn relatively to the pick in securing one to the other, or separating them, as hereinafter explained.

In the drawings—

Figure 1 is a perspective view of my improved pick.

Figure 2 represents a transverse section through the helve, ferrule, and socket.

The helve or handle proper, A, may be of wood, and has an axial perforation, *a*, to receive the screw-threaded shank, *b*, of a yoke, B or B', which, embracing the head of the pick D, and entering a notch, *c*, at the middle thereof, becomes, in conjunction with the nut E and socket F, effective to hold the said blade or head firmly in place.

The nut E is also a ferrule, which, being grasped and firmly screwed at *e*, or otherwise united to the handle proper, serves to preserve the same from splitting.

The nut E is provided with a number of inwardly-projecting splines, *e'*, which, in conjunction with the screws *e*, serve to connect the nut with the handle, and also to prevent the rotation of the former.

The socket F embraces the nut E in the manner shown, and has a notch, *f*, into which the head D fits, so as to secure both socket and head against lateral displacement, and cause them to rotate together when turned.

The tool is released by simply grasping it and the handle proper, and unscrewing them from each other, when another tool, being inserted, is secured by a reverse movement of the blade and handle respectively.

I am aware that a pick has before been secured to its handle by an eye attached to a screw-bolt passing completely through the handle, and held by a nut at the lower end thereof. This, therefore, I do not claim.

I claim as new, and desire to secure by Letters Patent—

The combination of the handle A, rectangular eye B, screw-stem *b*, ferrule-nut E *e'*, socket F, pick-head D, and notches *c* and *f*, all constructed, arranged, and employed in the manner and for the purposes described.

In testimony of which invention, I hereunto set my hand.

PATRICK J. HOGAN.

Witnesses:
GEO. H. KNIGHT,
JAMES H. LAYMAN.